US010483837B1

(12) United States Patent
Chen (10) Patent No.: US 10,483,837 B1
(45) Date of Patent: Nov. 19, 2019

(54) VARIABLE FREQUENCY MODULATION SCHEME BASED ON CURRENT-SENSING TECHNIQUES FOR SWITCHED-CAPACITOR DC-DC CONVERTERS

(71) Applicant: Renesas Electronics America Inc., Milpitas, CA (US)

(72) Inventor: Yen-Mo Chen, Morrisville, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 15/979,359

(22) Filed: May 14, 2018

(51) Int. Cl.
| H02M 3/07 | (2006.01) |
| H02M 1/088 | (2006.01) |
| H02M 3/158 | (2006.01) |
| H02M 1/00 | (2006.01) |

(52) U.S. Cl.
CPC ............ *H02M 1/088* (2013.01); *H02M 3/07* (2013.01); *H02M 3/158* (2013.01); *H02M 2001/0048* (2013.01)

(58) Field of Classification Search
None
See application file for complete search history.

(56) References Cited

U.S. PATENT DOCUMENTS

| 2010/0231134 A1* | 9/2010 | Makimura | H05B 41/2806 315/224 |
| 2011/0279173 A1* | 11/2011 | Singnurkar | H02M 3/07 327/536 |
| 2012/0153912 A1* | 6/2012 | Demski | H02M 3/07 323/282 |
| 2013/0121031 A1* | 5/2013 | Sims | H02M 1/44 363/15 |
| 2017/0279354 A1* | 9/2017 | Lueders | H02M 3/158 |
| 2017/0324321 A1* | 11/2017 | Hoyerby | H02M 1/088 |

OTHER PUBLICATIONS

Michael Douglas Seeman, "A Design Methodology for Switched-Capacitor DC-DC Converters", Electrical Engineering and Computer Sciences, University of California at Berkeley, May 21, 2009, 249 pages.

* cited by examiner

*Primary Examiner* — Jeffrey A Gblende
(74) *Attorney, Agent, or Firm* — Foley & Lardner LLP (57) ABSTRACT

The present embodiments are directed to an improved switched capacitor (SC) converter topology that does not include an inductor. In particular, the topology includes a ladder SC circuit configured as a cap divider, with a gate driving signal being generated to initiate the charging and discharging of the capacitor. In this specific topology, an unregulated output voltage is produced that is a certain fraction of an input voltage of a power source such as a battery. The present embodiments further include a variable frequency modulation (VFM) scheme based on the current-sensing techniques for the gate driving signal generation of the switched capacitor converter.

20 Claims, 9 Drawing Sheets

VARIABLE FREQUENCY MODULATION SCHEME BASED ON CURRENT-SENSING TECHNIQUES FOR SWITCHED-CAPACITOR DC-DC CONVERTERS

TECHNICAL FIELD

The present embodiments relate generally to switched-capacitor (SC) based DC-DC converters, and more particularly to modulation schemes of cap dividers that adopt a ladder topology.

BACKGROUND

DC-DC converters receive an input voltage from an input source (e.g., mains power, battery, etc.) and use it to provide an output voltage to loads (e.g., computers, IoT appliances, etc.). Conventional DC-DC converters frequently employ topologies that include inductors and power switches such as power MOSFETs. Such inductor-based topologies are problematic and/or they present certain design considerations which are not often easy to resolve.

SUMMARY

In one or more embodiments, an improved switched-capacitor (SC) converter topology is provided that does not include an inductor. In particular, the topology includes a ladder SC circuit configured as a cap divider, with a gate driving signal being generated to initiate the charging and discharging periods of the capacitor. In this specific topology, an unregulated output voltage is produced that is a certain fraction of an input voltage of a power source such as a battery. The present embodiments further include a variable frequency modulation (VFM) scheme for the gate driver logic based on load conditions.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments are based on an improved switched-capacitor (SC) converter topology that typically does not include an inductor. In particular, the topology includes a ladder SC circuit configured as a cap divider. The cap divider can be used to provide an unregulated output voltage Vout that is a certain fraction (e.g. 2) of input voltage Vin, such as Vin/2 (i.e., duty cycle≈50%). So it can be used to generate 1S voltage from a 2S battery, for example. Since it has an inductorless topology, it can achieve relatively small board space, reduced loss and high efficiency (>96%, especially at light loads) as compared to inductor-based topologies. However, a variable frequency modulation (VFM) scheme is needed to modulate the gate driving signals based on load conditions, for example.

Figure 1:
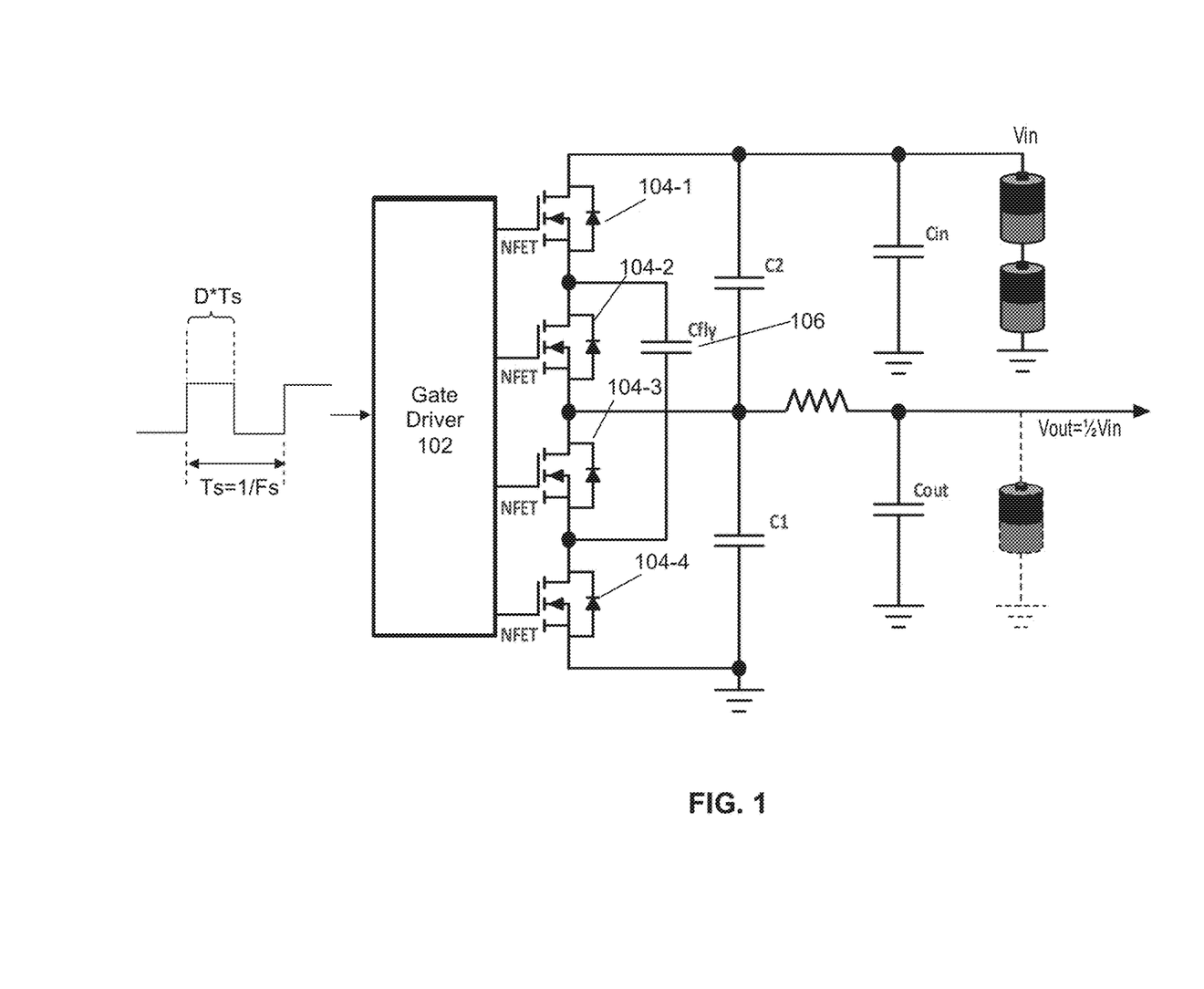
FIG. 1 is a block diagram illustrating an example cap divider having a ladder topology.

FIG. 1 is a block diagram illustrating an example cap divider topology for a SC converter. As shown in this example, an input voltage Vin is provided by a 2S battery. The example Vout is shown as equivalent to a 1S battery (i.e. Vout=Vin/2). A Gate Driver 102 drives four switches (e.g. NFETs) 104 coupled between Vin, Vout and ground so as to charge and discharge a flying capacitor Cfly 106, and thereby transfer the energy from the input to the output. As further shown in FIG. 1, a gate driving signal is sent to Gate Driver 102 to drive NFETs 104 as will be described in more detail below. The gate driving signal has a switching frequency Fs, a switching period Ts, and a duty cycle D, which in this case will ideally be about 50% due to the ratio of the input and output voltages Vin and Vout in this illustrated embodiment. However, other duty cycle ratios are possible for this embodiment and other embodiments (e.g. Vout=Vin/3, Vout=Vin/4, Vout=2Vin, Vout=3Vin, Vout=4Vin, etc.) to achieve certain performance metrics such as efficiency, ripple, or acoustic noise. Moreover, although Vin is shown in this example as being provided by a battery, other types of power sources are possible, such as power from an adapter, a power bank or other supplies that provide an adequate DC voltage. Vout can be provided to any type of load such as a CPU voltage regulator, an electronic load, a battery, a portable device, an IoT appliance, etc.

As will be appreciated by those skilled in the art, the switched capacitor converter shown in FIG. 1 adopts a ladder topology, which topology can be easily extended to other embodiments in which other Vout–Vin ratios are desired. For example, the circuit in FIG. 1 can be adapted for use for providing a Vout=Vin/3 ratio and/or a Vout=2Vin/3 ratio with the addition of two or more switched capacitors (i.e. flying capacitors and associated switches). However, further details thereof will be omitted here for sake of clarity of the invention. It should also be noted that the present embodiments are not limited to a ladder topology, and other topologies are possible, such as a serial-parallel topology, a doubler topology, etc., and those skilled in the art will be able to understand how to implement the present embodiments in such other topologies after being taught by the present examples.

Figure 2A:
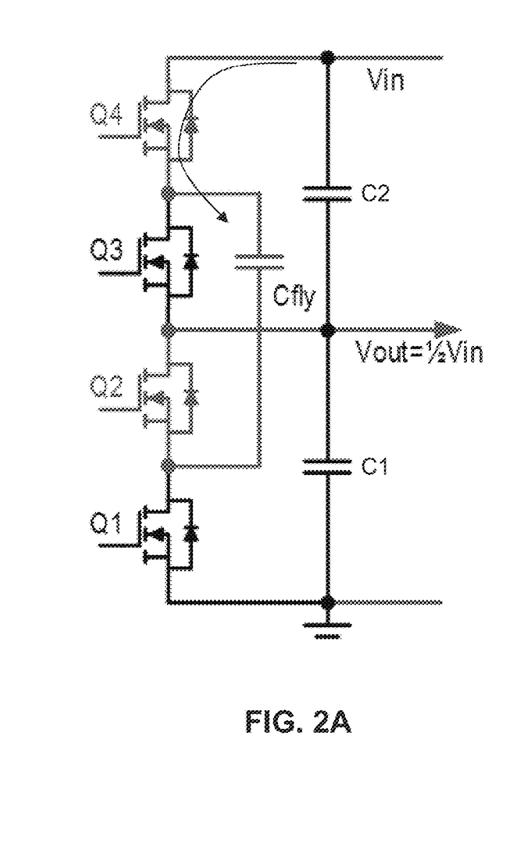
FIGS. 2A and 2B illustrate operational aspects of charging and discharging a flying capacitor of the cap divider.
Figure 2B:
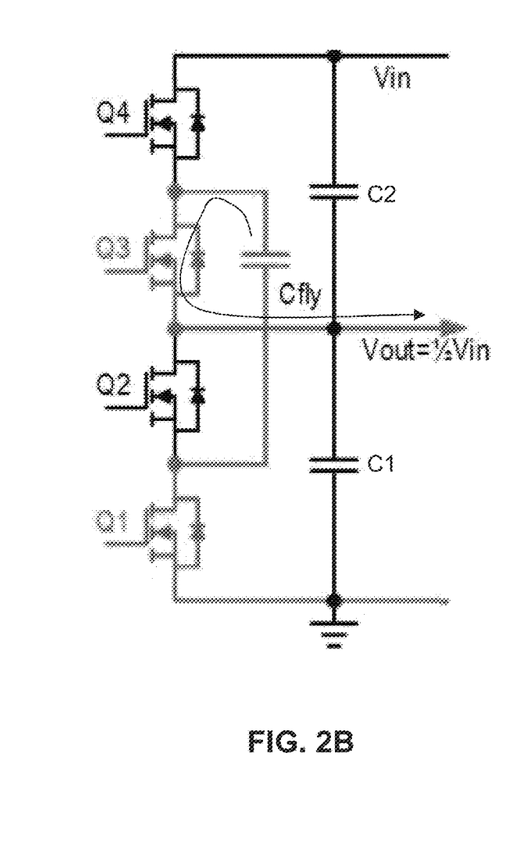

FIGS. 2A and 2B illustrate operational aspects of the switched capacitor DC-DC converter according to embodiments in more detail. As shown in FIG. 2A, to charge the flying capacitor Cfly, the NFETs Q2 and Q4 are switched on while the NFETs Q1 and Q3 are switched off (e.g., in accordance with a "low" value of a switching control signal). This causes the flying capacitor Cfly to be charged from the input (specifically, transferring the charge to Cfly from "decoupling" capacitor C2 that is switched in parallel with Cfly by Q2 and Q4). As shown in FIG. 2B, to discharge the flying capacitor Cfly, the NFETs Q1 and Q3 are switched on while the NFETs Q2 and Q4 are switched off (e.g., in accordance with a "high" value of a switching control signal), which causes the capacitor to discharge to the output (specifically, transferring the charge from Cfly to "output" capacitor C1 that is switched in parallel with Cfly by Q1 and Q3, and thereby establishing the output voltage Vout at the output). The charging and discharging operations of the flying capacitor thus result in the energy transfer from input to output.

Figure 3:
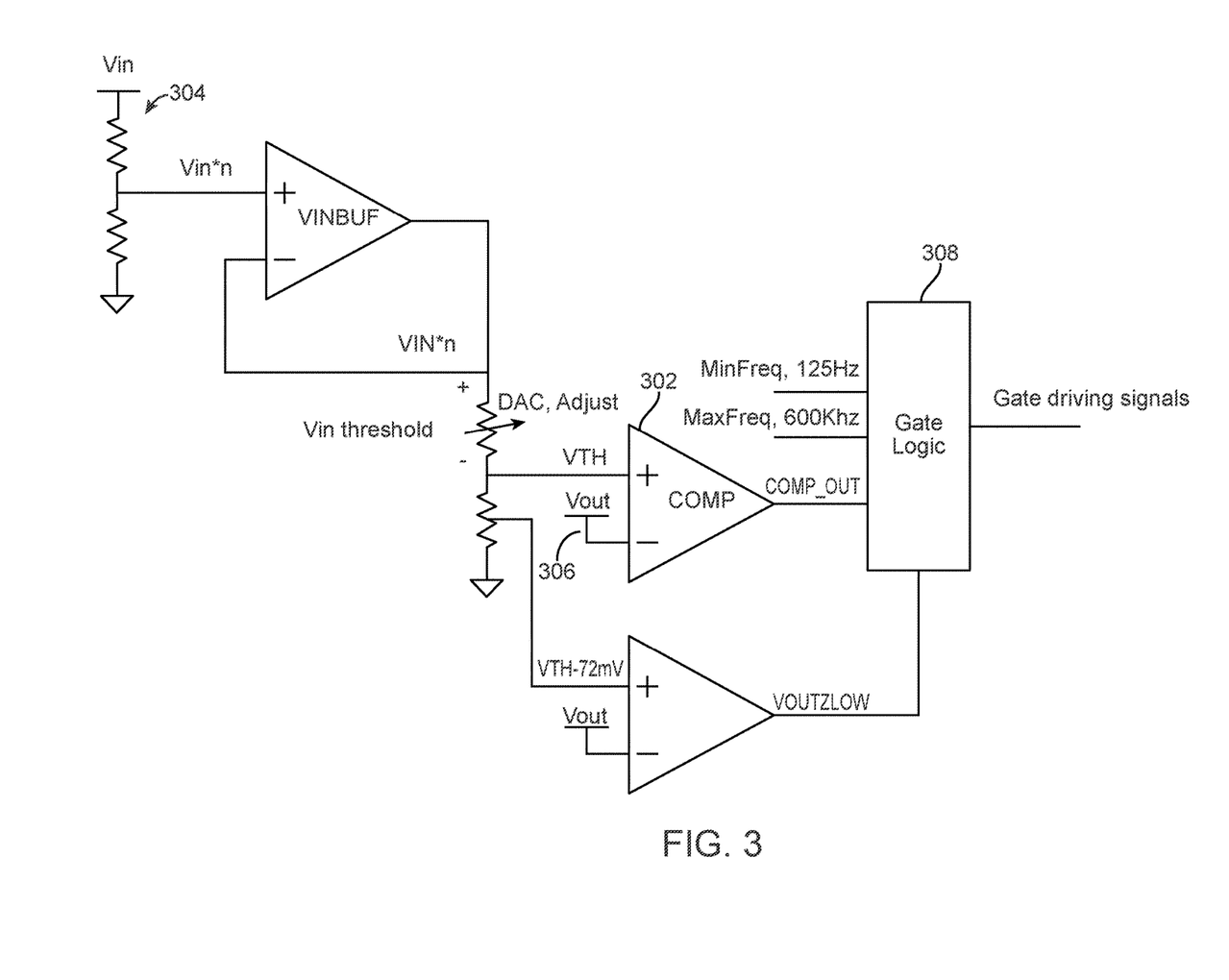
FIG. 3 is a block diagram illustrating one example conventional approach for implementing variable frequency modulation.

As set forth above, although the duty cycle D can remain substantially constant based on the required input-to-output voltage conversion ratio n (e.g., n=½), a variable frequency modulation scheme of the switching frequency Fs is needed to improve performance metrics such as efficiency, ripple, and acoustic noise. One conventional approach is called Vin-Threshold Based Modulation. In this approach, as shown in FIG. 3, gate driving signal generation is adjusted on the basis of the output of a comparator 302. This approach requires two sensing circuits 304, 306, one for Vin and one for Vout, as well as a comparator 302. Variable frequency modulation is performed by logic 308 on the basis of the results of comparing (Vin*n–Vin threshold) and Vout.

Figure 4:
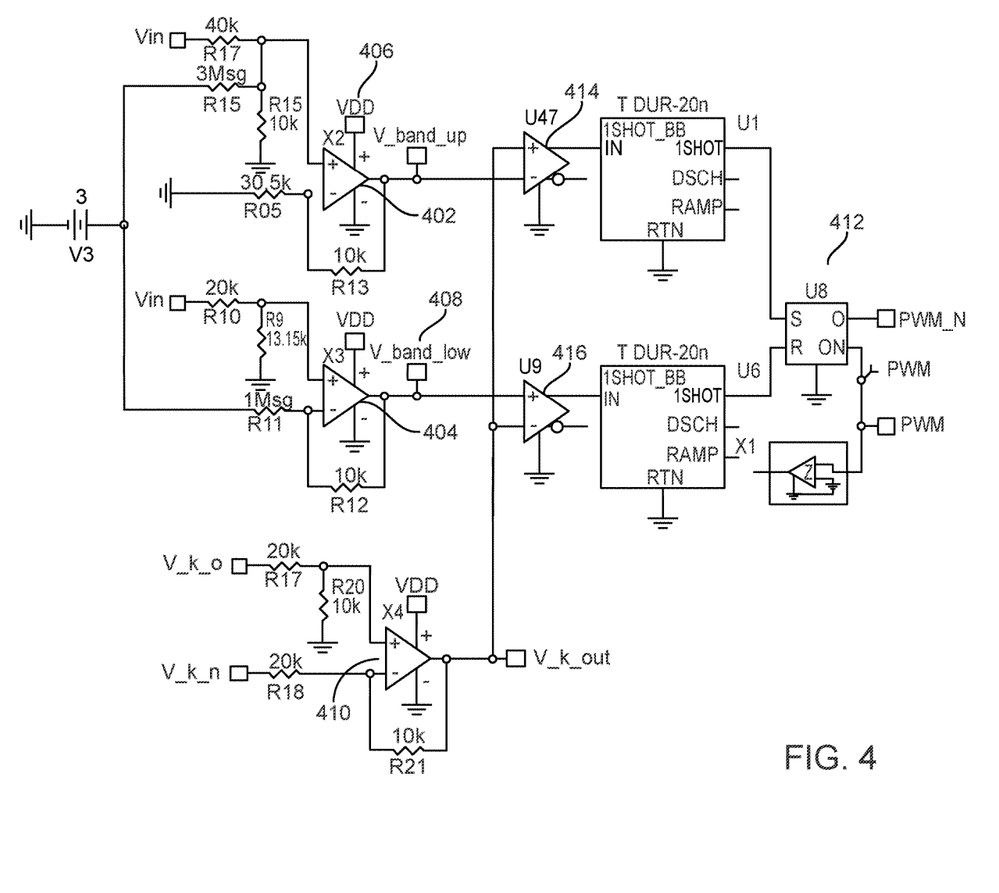
FIG. 4 is a block diagram illustrating another example conventional approach for implementing variable frequency modulation.

A second conventional approach is called Hysteresis-Window Based Modulation. In this approach, as shown in FIG. 4, gate driving signal generation is adjusted using comparator outputs based on a hysteresis window of the flying cap voltage. Two operational amplifiers 402, 404 are required for the upper and lower window levels 406, 408, respectively. Differential amplifier 410 sensing on the flying cap voltage is required, which is difficult for IC design. Variable frequency modulation is performed by gate logic 412 on the basis of comparing the flying cap voltage to the hysteresis windows using comparators 414, 416.

Figure 5:
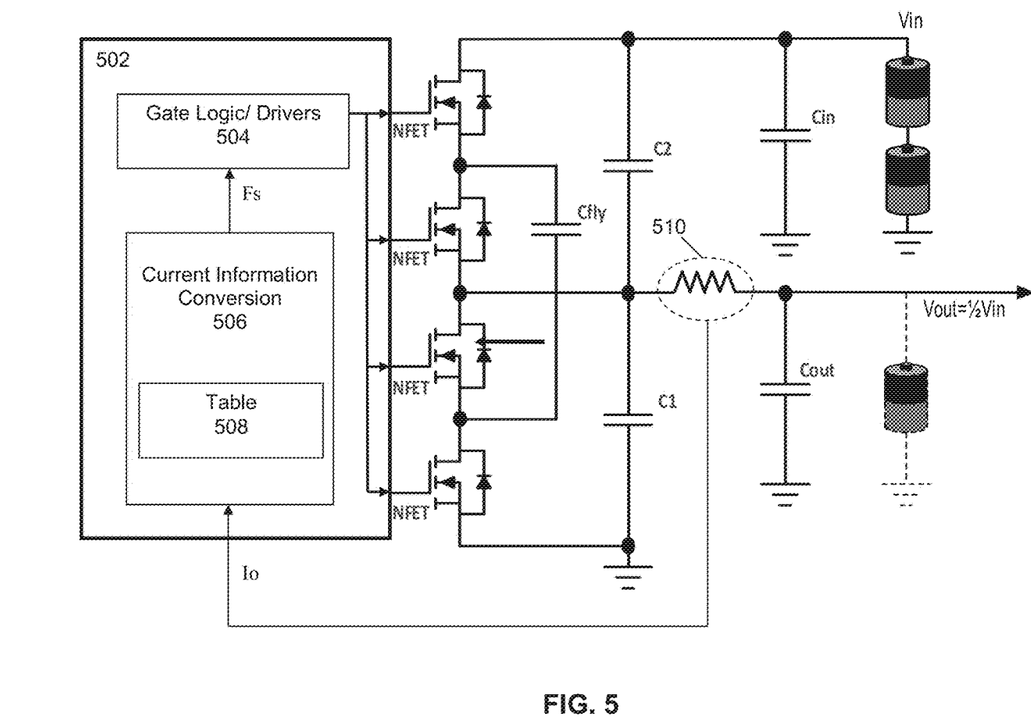
FIG. 5 is a block diagram illustrating an example approach for implementing variable frequency modulation in accordance with the present embodiments.

According to certain aspects, the present embodiments aim to overcome some of the issues in conventional frequency modulation schemes such as those described above in connection with FIGS. 3 and 4, among others. FIG. 5 is a block diagram of an example SC converter implementing a frequency modulation scheme according to the present embodiments. It should be noted that this example adopts a ladder topology, but this is not necessary in all embodiments. It should be further noted that although only a single phase converter is shown, the principles of the embodiments can be extended to multiphase and/or interleaved converters.

As shown in this example, a modulator 502 includes gate logic/drivers 504 and current information conversion logic 506. As further shown, current information conversion logic 506 uses a lookup table 508 to convert a current sensed from sense resistor 510 into a switching frequency, a duty cycle, and any pulse-generation or pulse-skipping parameters that can be implemented by gate logic/drivers 504. For example, lookup table 508 stores data corresponding to predefined current-to-frequency curves from which current information conversion logic 506 can select and/or determine an appropriate switching frequency based on the sensed current information. Note that the sense resistor 510 can be placed on the input side as well as other appropriate locations or be substituted with other current-sensing techniques.

As will be described in more detail below, the current information can be mapped to various switching frequency options through lookup table 508 depending on efficiency/ripple targets, for example. In this regard, it should be noted that table 508 in some embodiments can store multiple profiles and/or curves that are linear or nonlinear to convert the current information into switching frequency, duty cycle and any pulse-generation or pulse-skipping parameters, and logic 506 can be configured to use data processed in real-time, near-real-time, or non-real-time for selecting, adjusting, or generating the profiles and curves of table 508, for example using pinstraps, input signals or other such mechanisms and algorithms (not shown) at any given time or under certain operating conditions. It should be further noted that table 508 or other tables can store additional gate driving parameters other than switching frequency, which can be used using logic 506 or other logic.

Figure 6:
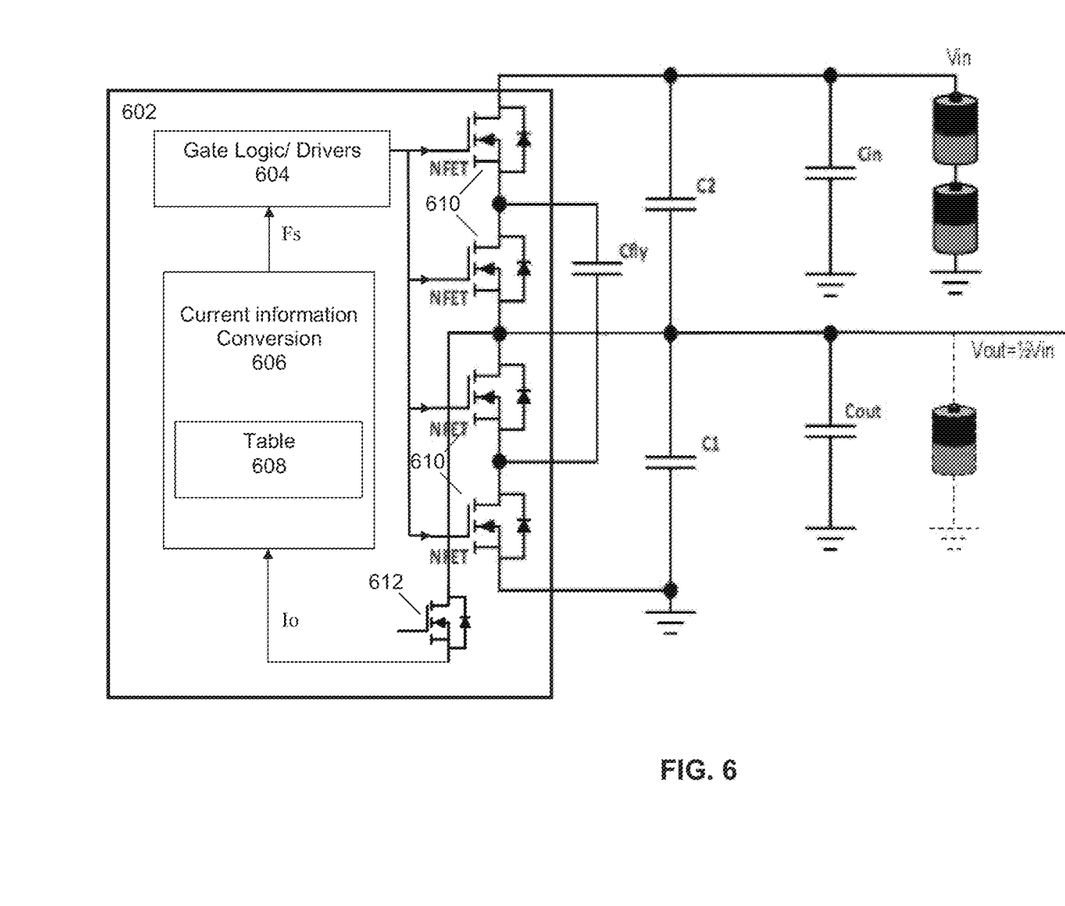
FIG. 6 is a block diagram illustrating another example approach for implementing variable frequency modulation in accordance with the present embodiments.

FIG. 6 is a block diagram of another example frequency modulation scheme according to the present embodiments.

As shown in this example, a modulator 602 includes gate logic/drivers 604 and current information conversion logic 606, as well as integrated power MOSFETs 610 and an integrated SENSEFET 612. As further shown, current information conversion logic 606 uses a lookup table 608 to convert a current sensed from SENSEFET 612 into a switching frequency, a duty cycle and any pulse-generation or pulse-skipping parameters that can be implemented by gate logic/drivers 604. Similar to the previous example, lookup table 608 stores data corresponding to predefined current-to-frequency curves from which current information conversion logic 606 can select and/or determine an appropriate switching frequency based on the sensed current information, as will be described in more detail below.

It should be appreciated that modulators 502 and 602 in FIGS. 5 and 6, respectively, can be implemented in various ways known to those skilled in the art after being taught by the present examples. It should be further appreciated that, although gate logic/drivers 504/604 are shown separately from current information conversion logic 506/606, this is done for ease of illustration only. For example, gate logic/ drivers 504/604 and current information conversion logic 506/606 can be partially or fully implemented using shared or common circuit elements. It should be still further appreciated that modulators 502 and 602 can include additional or fewer components than illustrated in these examples. And still further, current sensing elements other than resistors and SENSEFETs can be used.

Figure 7:
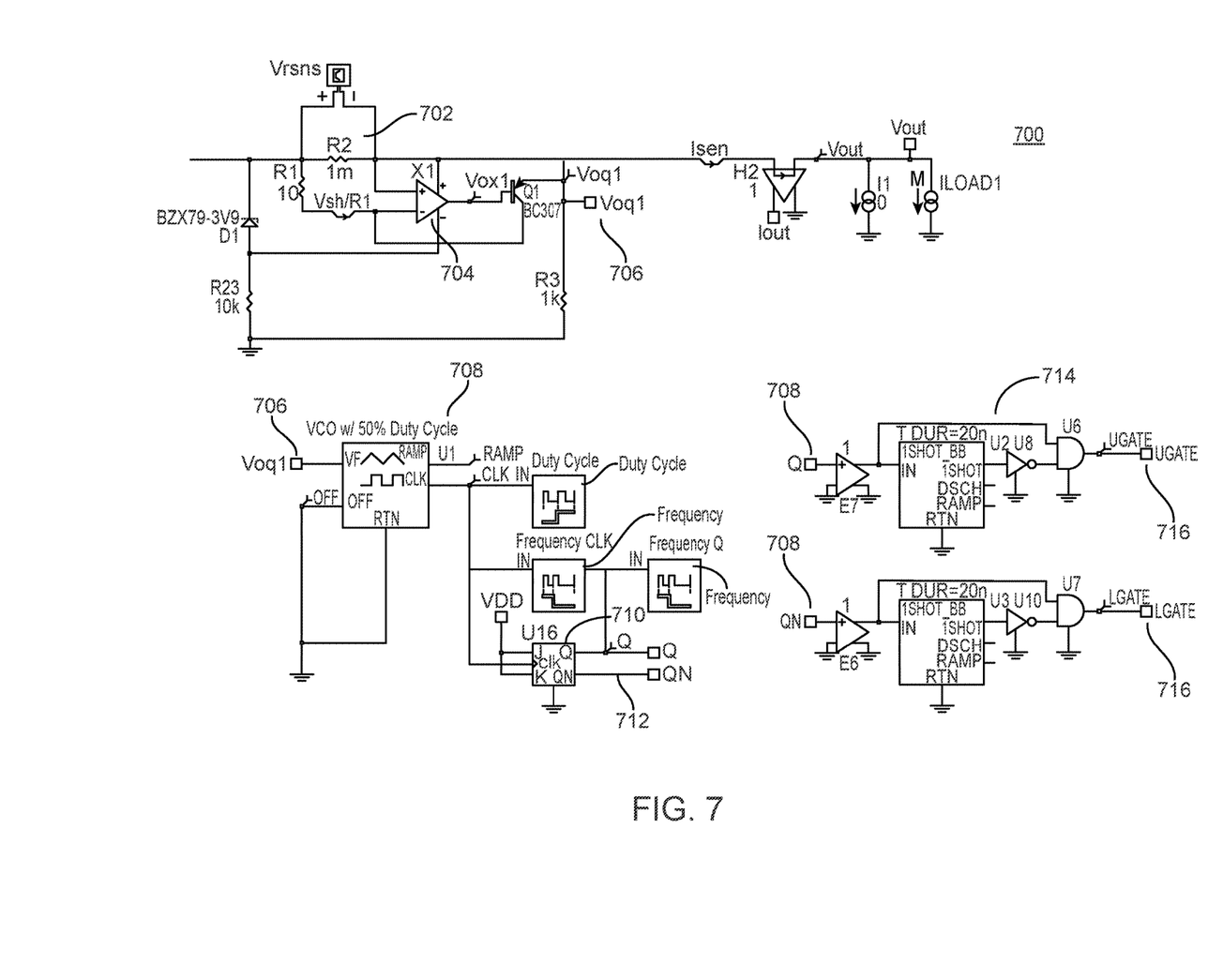
FIG. 7 is a block diagram illustrating yet another example approach for implementing variable frequency modulation in accordance with the present embodiments.

FIG. 7 is a block diagram of yet another example frequency modulation scheme according to the present embodiments.

Differently from the other example, this scheme does not include lookup tables. Rather, in modulator 700, the current is used directly to generate a switching frequency. Current sensing is performed using a current sense resistor 702 and a low voltage current sense amplifier 704 (e.g. operational amplifier) with level shifting to produce a sense voltage 706. This sense voltage 706 is fed to a voltage controlled oscillator (VCO) 708 which produces a fixed duty cycle clock signal output (e.g. 50% duty cycle for example) having a frequency dependent on the voltage 706 (e.g. a linear dependence for a given range of voltages). This clock signal is provided as a clock input to J-K flip flop 710 to produce a gate driving signal Q and a complementary gate driving signal QN at its Q and QN outputs, respectively. These signals 712 are provided to driver 714 to thereby drive (e.g. using one-shots) the gates of the appropriate switches at a switching frequency determined by voltage 706.

It should be noted that the example components and their configurations described above in connection with controller 700 are non-limiting and various alternatives are possible. For example, instead of a VCO, other types of voltage-to-frequency converters can be used. It should be further noted that certain components described above in connection with controller 700 can also be used to implement some components of controllers 502 and 602, and those skilled in the art will understand how to adapt such components after being taught by the present examples.

Figure 8:
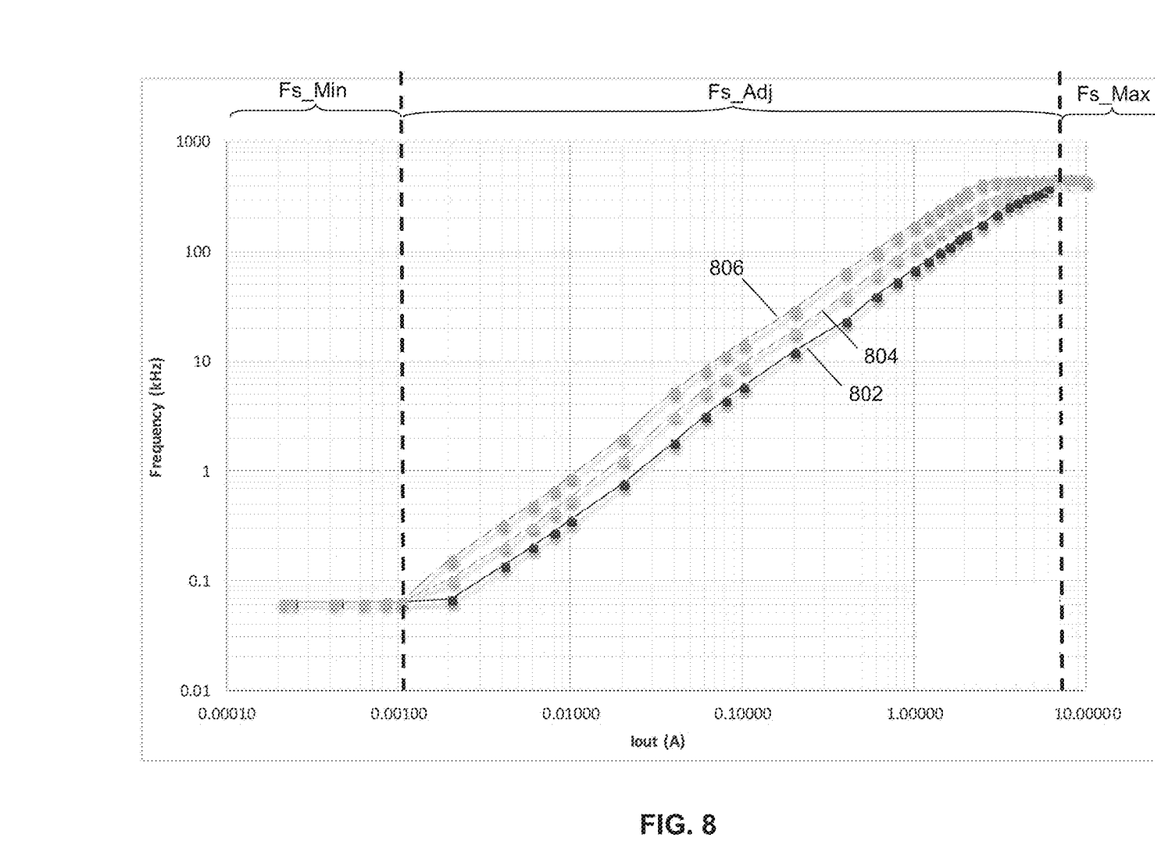
FIG. 8 is a diagram illustrating aspects of tables of frequency values for a sensed current that can be used in some of the present embodiments.

FIG. 8 is a diagram illustrating example predefined current-to-frequency curves according to embodiments, such as those mentioned in connection with the schemes of FIGS. 5 and 6.

In this example, each of the curves 802, 804 and 806 can be divided into three major zones: Fs_Min, Fs_Adj, Fs_Max. Whereas the data of curves 802, 804 and 806 are the same in the Fs_Min and Fs_Max zones, the curves 802, 804 and 806 in the Fs_Adj zone can be differently implemented with multiple segments with different slopes. For example, these different values can provide flexibility so as to provide multiple Fs options for optimizing efficiency, ripple, acoustic noise and other performance metrics. This is advantageous because conventional VFM schemes typically implement a single switching frequency at a given current once the capacitor combination is determined. Moreover, frequency modulation according to the embodiments can be made independent from the capacitance of input/output/flying capacitors. For example, the present embodiments should work well even if there is a very large Cout or battery connected to the output. Still further, the frequency modulation of the present embodiments is independent from the component parasitic and PCB layout, and thereby less sensitive to noise introduced at the input and output. The current can be sensed from different components and locations and be used for various SC topologies with any power flow direction. In sum, therefore, there is very low risk in implementing the scheme of the present embodiments. Variable frequency modulation and low gate jitter is guaranteed throughout the entire load range as long as the current information is reliable, and efficiency at light loads remains excellent.

Figure 9:
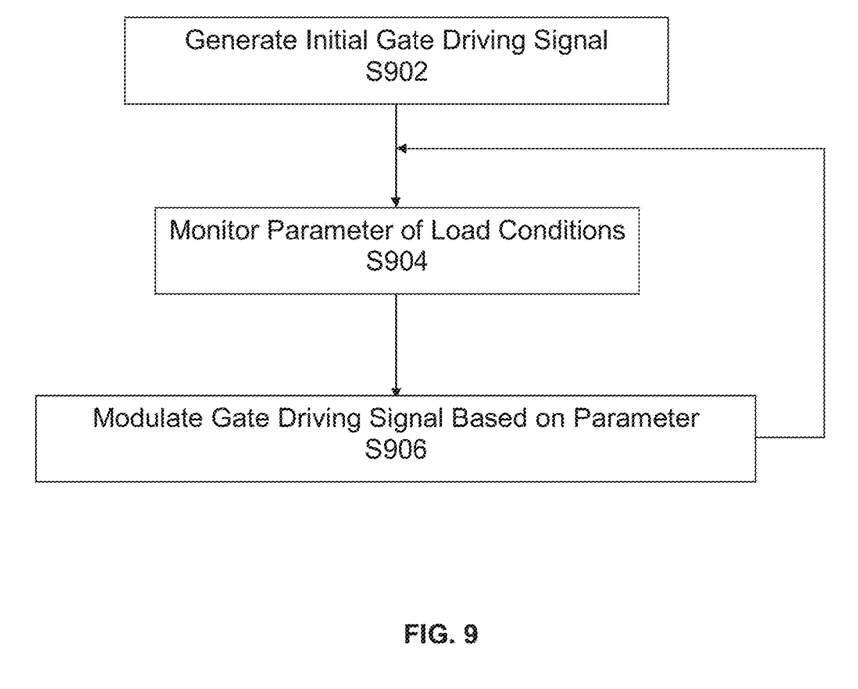
FIG. 9 is a flowchart illustrating an example variable frequency modulation methodology according to the present embodiments.

FIG. 9 is a flowchart of an example gate signal modulation methodology according to embodiments.

As shown in this example, in a step S902, an initial gate driving signal is generated with appropriate switching frequency, duty cycle, and any other pulse generation or pulse skipping parameters. The switching frequency of the gate driving signal, for example, can be a predetermined frequency but may be adjusted if necessary. As set forth above, the duty cycle can be fixed in accordance with a required input-to-output voltage conversion ratio but other duty cycles are also possible. For example, if the ratio is Vout=Vin/2, then the duty cycle can be set at 50%, 45%, 40%, etc.

In step S904 a parameter of a load condition is sensed. For example, the parameter can be the current being drawn by the load. This can be sensed in various ways as set forth above, such as using a sense resistor at or near an output node or input node, a SENSEFET near power transistors, etc.

In response to the sensed parameter (e.g. current), in step S906 the gate signal is modulated. In some example embodiments, a lookup table is used to determine the appropriate switching frequency. In such embodiments, if the sensed current value does not correspond to a specific entry of the lookup table, two frequency values can be extracted from the table for the two closest current values in the table above and below the sensed current value, and the frequency for the sensed current value can be interpolated using the frequency values for the two closest current values. In other examples, the sensed current value can be rounded to the closest current value in the table, and a single frequency value can be extracted. In other embodiments not including a lookup table, a direct current-to-frequency conversion operation can be performed, for example using a VCO.

The steps above can be repeated continuously until no further modulation is needed.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An apparatus for converting an input voltage at an input to an output voltage at an output, the apparatus comprising:
 a capacitor, wherein the capacitor is configured such that a charging and discharging of the capacitor transfers energy from the input to the output;
 switches configured to control the charging and discharging of the capacitor;
 a controller that controls a switching frequency of the switches based on a current associated with the transfer of energy from the input to the output; and
 a lookup table coupled to the controller, wherein the controller is configured to set the switching frequency based on the current using one or more entries in the lookup table,
 wherein the lookup table stores a plurality of different switching frequency values for a same given current value, and wherein the controller is configured to select a certain at least one of the plurality of different switching frequency values based on the current, and wherein the plurality of different switching frequency values for the same given current value correspond to a plurality of different performance metric values associated with the transfer of energy from the input to the output.

2. The apparatus of claim 1, further comprising a current sense resistor coupled to the controller that is configured to sense the current.

3. The apparatus of claim 1, further comprising a SENSEFET coupled to the controller that is configured to sense the current.

4. The apparatus of claim 1, wherein the controller includes a voltage controlled oscillator that is configured to control the switching frequency in accordance with a voltage based on the current.

5. The apparatus of claim 1, wherein the switches comprise FETs, and wherein the controller is coupled to provide gate driving signals to the gates of the FETs, the gate driving signals having the switching frequency.

6. The apparatus of claim 5, wherein the gate driving signals further have a duty cycle that is at least partially dependent on a ratio between the input voltage and the output voltage.

7. The apparatus of claim 1, wherein the capacitor is configured to transfer energy from the input to the output without use of an inductor.

8. The apparatus of claim 1, wherein the switches and the capacitor are configured in a ladder topology.

9. The apparatus of claim 1, further comprising a decoupling capacitor for use in charging the capacitor with the input voltage.

10. The apparatus of claim 1, further comprising an output capacitor for use in storing the output voltage as a result of the discharging of the capacitor.

11. A method for converting an input voltage at an input to an output voltage at an output, the method comprising:
charging and discharging a capacitor so as to transfer energy from the input to the output;
operating switches to control the charging and discharging of the capacitor;
controlling, by a controller, a switching frequency of the switches based on a current associated with the transfer of energy from the input to the output; and
setting, by the controller, the switching frequency based on the current using one or more entries in a lookup table,
wherein the lookup table stores a plurality of different switching frequency values for a same given current value, the method further comprising selecting a certain at least one of the plurality of different switching frequency values based on the current, and wherein the plurality of different switching frequency values for the same given current value correspond to a plurality of different performance metric values associated with the transfer of energy from the input to the output.

12. The method of claim 11, further comprising sensing the current using a current sense resistor coupled to the controller.

13. The method of claim 11, further comprising sensing the current using a SENSEFET coupled to the controller.

14. The method of claim 11, wherein the controller includes a voltage controlled oscillator, wherein controlling the switching frequency is performed in accordance with a voltage based on the current.

15. The method of claim 11, wherein the switches comprise FETs, the method further comprising providing, by the controller, gate driving signals to the gates of the FETs, the gate driving signals having the switching frequency.

16. The method of claim 15, wherein the gate driving signals further have a duty cycle that is at least partially dependent on a ratio between the input voltage and the output voltage.

17. The apparatus of claim 1, wherein the performance metric values comprise different efficiency values.

18. The apparatus of claim 1, wherein the performance metric values comprise different ripple values.

19. The method of claim 11, wherein the performance metric values comprise different efficiency values.

20. The method of claim 11, wherein the performance metric values comprise different ripple values.

* * * * *